Dec. 9, 1958 P. H. TAYLOR 2,863,508
BALANCED-FORCE LIQUID SPRING
Filed March 28, 1955 2 Sheets-Sheet 1
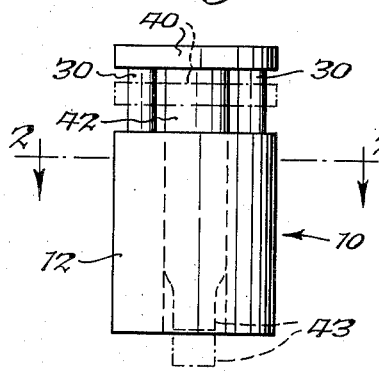
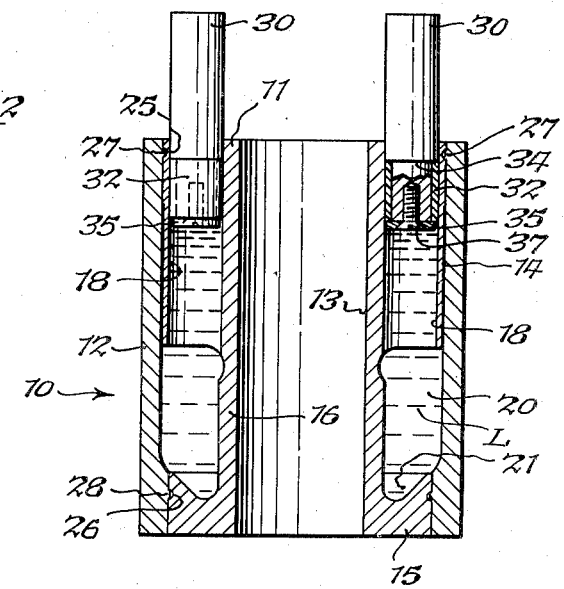
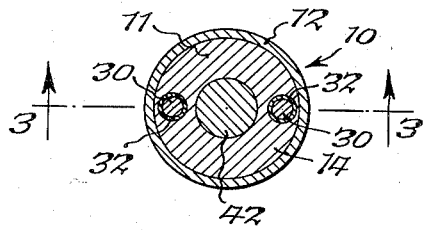
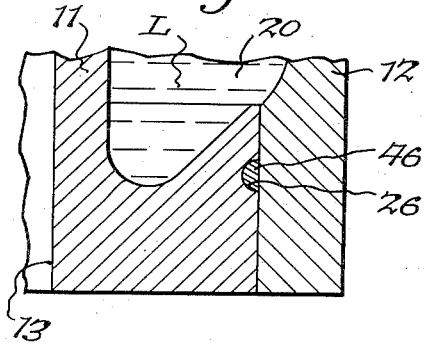
INVENTOR.
Paul H. Taylor
BY
Attorney.

Dec. 9, 1958 P. H. TAYLOR 2,863,508
BALANCED-FORCE LIQUID SPRING
Filed March 28, 1955 2 Sheets-Sheet 2

INVENTOR.
Paul H. Taylor
BY
Attorney.

United States Patent Office 2,863,508
Patented Dec. 9, 1958

2,863,508

BALANCED-FORCE LIQUID SPRING

Paul H. Taylor, Grand Island, N. Y., assignor to Wales-Strippit Corporation, North Tonawanda, N. Y., a corporation of New York Application March 28, 1955, Serial No. 497,009

11 Claims. (Cl. 164—94)

The present invention relates to liquid springs, that is, to elastic devices in which a compressible confined liquid is utilized as the resilient medium, and to apparatus, such as punching apparatus, in, or with, which liquid springs are used.

The conventional liquid spring comprises a container having a chamber therein filled with a compressible liquid, and a piston reciprocable in said chamber to compress the liquid on its inward stroke. The container is closed at both ends, the piston projecting externally of the container through one end of the container. Such a spring is adapted to be interposed between two relatively movable parts with the container seating against one part and the projecting portion of the piston engaging against the other part. In conventional practice, one end of the container is closed by a plug; and in some cases both ends of the container are closed by plugs. The plugs are customarily brazed in place.

Liquid springs are capable of carrying relatively large loads, and are subjected, therefore, to tremendous pressures. In some spring applications the liquid is subjected to operating pressures of as much as 50,000 pounds per square inch by a piston having a diameter of ½ inch and a ¾ inch stroke. Obviously, in such an application the forces produced within the spring are enormous. They tend to separate the braze joint between the plug and the container body. The braze has, therefore, heretofore been one of the limiting factors of the load-carrying capacity of a liquid spring.

One object of the present invention is to provide a liquid spring in which the forces due to internal pressure are equalized within the spring structure itself rather than being transferred to the braze or other joint between the metallic parts of the spring.

Another object of this invention is to provide a liquid spring in which the internal forces within the spring that tend to separate the component parts of the spring, are carried throughout the steel of the parts rather than directed against the braze or other joint that binds those parts together.

Another object of the invention is to provide a liquid spring in which the internal pressure forces are so distributed that the braze, or other joint, which secures the metal parts of the spring together only has to prevent leakage between the parts.

A further object of this invention is to provide a liquid spring which has a greater load-carrying capacity than springs of prior design and comparable size.

Still another object of the invention is to provide a punching apparatus having a liquid spring that is adapted to be compressed on the working stroke of the punch and that strips the punch from the work upon completion of the working stroke, which is so constructed that a balanced stripping force will be applied to the punch, and that there will be no tendency of the punch to cock or bind in the bore or guide in which it reciprocates.

Other objects of the invention will be apparent hereinafter from the specification and from the recital of the appended claims.

In the drawings:

Fig. 1 is a side view showing an application of a liquid spring, constructed according to one embodiment of this invention, to punch apparatus, for stripping the punch at the end of a working stroke;

Fig. 2 is a cross section taken on line 2—2 of Fig. 1, looking in the direction of the arrows;

Fig. 3 is an axial section on a somewhat enlarged scale of the liquid spring portion of the punching device shown in Fig. 1, the section being taken on line 3—3 of Fig. 2 and looking in the direction of the arrows;

Fig. 4 is a still further enlarged, fragmentary section in the same plane as Fig. 3, showing how the sleeve, which forms the outer wall of the spring, may be locked to one end of the inner spool of the spring by shrinking it on the spool;

Fig. 5 is a section, similar to Fig. 4, but showing an alternative construction of spring in which the external sleeve is soldered to the internal spool;

Figure 6:
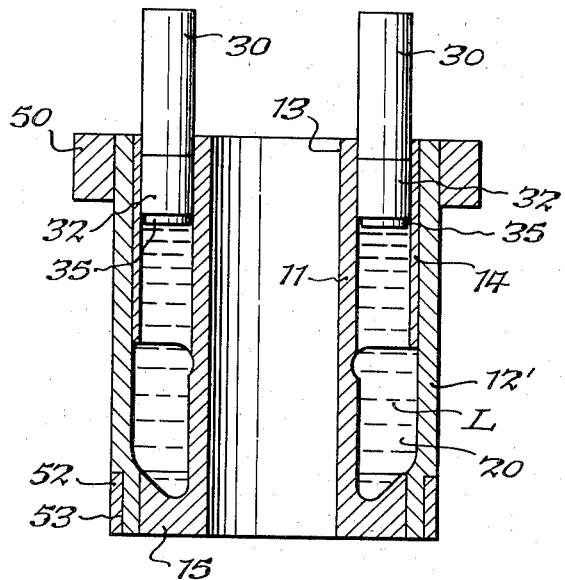
Figure 7:
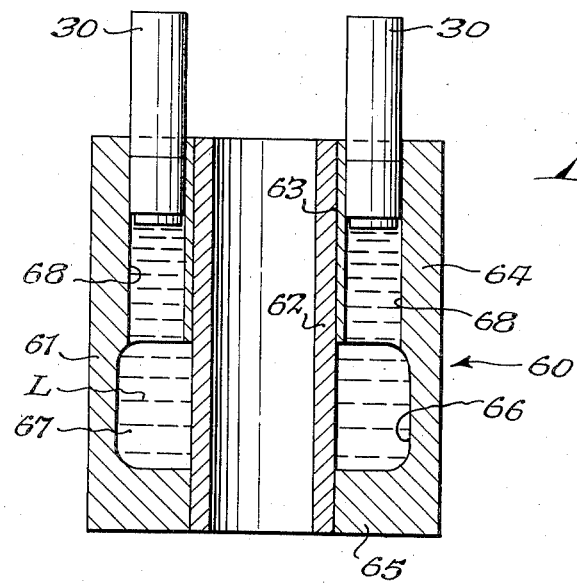

Fig. 6 is an axial section of a liquid spring constructed according to a further modification of this invention, in which external shrink rings are provided around the outer sleeve at opposite ends of the spring to resist any tendency of the external sleeve to separate from the internal spool due to internal pressure in the spring; and Fig. 7 is an axial section of a liquid spring constructed according to still another embodiment of this invention, the liquid chamber being here formed internally in the outer wall of the spring and the internal member being here a simple tube or sleeve.

Referring now to the drawings by numerals of reference, and first to Figs. 1 to 4 inclusive, 10 denotes generally a punching device incorporating a liquid spring constructed according to one embodiment of this invention. The spring comprises a container formed from an internal spool 11 and a surrounding external sleeve 12.

Spool 11 has a central, cylindrical bore 13, which extends axially through it, and which has head or flange portions 14 and 15 at its opposite ends. The head portion 14 is of considerable axial extent and is provided with a pair of cylindrical bores 18 which extend completely through it and which are disposed, respectively, at opposite sides of bore 13, and are parallel thereto and to one another. The head portions 14 and 15 are of larger diameter than the stem or body portion 16 of the spool, thereby providing a recess around the periphery of the spool between these axially-spaced head portions 14 and 15.

The external sleeve 12 surrounds the spool, forming with this recess a chamber 20. This chamber and the cylinders 18, which communicate therewith, are filled with a compressible liquid L, such as a silicone base liquid. Such liquids have a compressibility by volume of 12% at 20,000 p. s. i.

Sleeve 12 is secured about the peripheries of the head portions 14 and 15 of the spool 11 above and below chamber 20 in such way as to prevent leakage of the liquid between the sleeve 12 and the heads 14 and 15 along their joints or junctures. In the embodiment shown in Figs. 1 to 4, the two head portions 14 and 15 of the spool are brazed to the surrounding inside surface of the sleeve 12. The braze joint is preferably formed at one end of the spool, at least, in the same way as the joint disclosed in my pending U. S. patent application, Serial No. 276,189, filed March 12, 1952, now Patent 2,733,060, granted January 31, 1956. To this end, the head portion 15 of the spool is dished internally on its upper side as denoted at 21. This dishing leaves a flexible lip 22 at the outside of the upper end of this head portion which can be free to move and is not actually brazed to the sleeve and which under pressure of the liquid in the spring, when the liquid is compressed as described hereinafter, will flex with the sleeve 12, and follow the sleeve and maintain a tight seal between head portion 15 and the sleeve. Preferably, in addition to brazing the sleeve to the spool, the sleeve is shrunk on the spool. To this end, as shown in Fig. 3, the head portions 14 and 15 of the spool 12 are provided with peripheral grooves 25 and 26, respectively. When sleeve 12 is heated and shrunk around the spool, the tang portions 27 and 28 of the sleeve protrude into these grooves, locking the sleeve securely to the spool, and strengthening the braze joint, providing with the braze a leak-proof, liquid-tight connection between the spool and the sleeve.

A pair of pistons 30 are reciprocably mounted in the cylinders 18. The inner ends of these pistons are of reduced diameter and carry nylon, or other suitable sleeve seals 32, to prevent the escape of liquid past the pistons when they reciprocate in the bores 18. The seals 32 are secured against shoulders 34 on the pistons by washers 35 and screws 37, the latter threading into the pistons.

Mounted on or contacting the flat upper ends of the pistons 30 is a plate 40 (Fig. 1). Connected to the plate 40 is a punch 42 which reciprocates in the bore 13 in spool 11. The lower or working end 43 of punch 42 normally is positioned slightly above the bottom of the sleeve 12 which here acts as a stripper.

Punching device 10 is adapted to be positioned in a press with the spool 11 and sleeve 12 seating against or adjacent to, a workpiece to be perforated. When the ram of the press descends it engages plate 40 forcing it, and the punch 42 secured thereto, downwardly, as indicated in dotted lines in Fig. 1, and driving the perforating end 43 of the punch through the workpiece. In this movement the liquid L is compressed. As soon as the compressive force is relieved by return movement of the ram, the liquid L expands to its original volume, returning pistons 30 and plate 40 to their original positions, and stripping punch 42 from the workpiece.

One of the most important features of the present invention is the use of a spool as a part of the spring. The spool helps equalize the pressure forces within the spring. Thus, the forces acting on one head portion 15 of the spool are counteracted by the forces acting on the other head portion 14 of the spool. In other words, the pressure produced in the spring by the compression of liquid L will extert a thrust on head portion 15 which is opposed by the thrust of the liquid on head portion 14. The pressure forces therefore will be transmitted through the shank or body portion 16 of the spool 11 rather than against the joint at either end of the spring. Thus, a spring made according to the present invention can carry greater loads without danger of destruction than conventional types of liquid springs.

The forces within spring 10 can be exactly equalized by making the areas of the opposed faces of the two head portions 14 and 15 of the spool equal. Since the head portion 14 has bores 18 in it, this can be accomplished by making the head portion 15 of slightly smaller diameter than head portion 14, as shown in Fig. 3. Sleeve 12 has a greater thickness and smaller internal diameter at its lower end than at its upper end to fit the smaller diameter of the head portion 15 of the spool.

Another feature of the invention, as applied to the punching apparatus of Fig. 1, is that the forces on the punch itself are equalized. The guiding of the punch in a central bore in the spring, and the disposition of the two stripping pistons 30 at diametrically opposite sides of this central bore 13 and at equal distances therefrom insure against canting or cocking of the punch in bore 13 and assure easy stripping action.

Because of the equalizing action of the spool, so far as the internal forces are concerned, instead of brazing the sleeve 12 on the spool 11, it can even be connected to the spool 12 by soft-soldering it in position, as shown in Fig. 5. The soft-solder 46 is placed in the annular grooves 25 and 26 of the spool heads 14 and 15. There is no appreciable force tending to separate the joint. Hence the soft-solder will hold. However, the sleeve 12 may also be shrunk on the spool as is the case in the embodiment of Figs. 1 to 4 inclusive, thereby strengthening the solder joint.

In some instances it may be desirable, in addition to brazing the sleeve and spool together, to use shrink-rings for strengthening the joints between the sleeve and the spool. These shrink rings can be used instead of shrinking the sleeve itself on the spool. Shrink rings 50 and 52 are so used in Fig. 6. Sleeve 12' is here provided with a bore that is reduced in diameter at its lower end; and to maintain substantially uniform thickness of the sleeve throughout its length it is provided adjacent its lower end with a peripheral recess 53 to receive ring 52. The reduced diameter portion of the bore of the sleeve is again for the purpose of receiving a head portion 15 which is smaller than head portion 14.

Shrink rings are used particularly where the spool cannot be formed with a lip type joint. The internal pressure within the spring, as previously stated, tends to expand the external sleeve 12' so that it tends to separate from the spool, and thereby puts the braze in tension. By using the external shrink rings 50 and 52, the outer sleeve 12' is pre-stressed in the direction of the braze, just as it is when shrunk directly on the spool, to resist the tendency of the joints to separate from the internal pressure. However, the shrink rings can also be used to advantage even when a lip type joint is employed, as is shown in Fig. 6.

In the spring 60 shown in Fig. 7, the spool and sleeve have reversed relation as compared with the embodiments previously described. Here the external member 61 of the spring is in effect the spool, and surrounds the sleeve 62 which is mounted concentrically within this spool. External member 61 is tubular having a central bore 63. It has head portions 64 and 65 at opposite ends that are spaced from one another. Between the head portions the member 61 is internally recessed, as denoted at 66. Sleeve or tube 62 is secured in the bore 63 of member 61 and extends axially therethrough from one end of member 61 to the other. It is brazed in the head portions 64 and 65 of the chamber 61. It forms with the internal annular recess 66 a chamber 67. Head portion 64 is provided with two cylindrical bores 68 which extend therethrough at diametrically opposite sides, respectively, of the axis of the member 61 and which are parallel to bore 63 and to one another. These bores communicate with chamber 67. Pistons 30 reciprocate in bores 68.

A compressible liquid L fills chamber 67 and the communicating bores 68. When the pistons 30 are moved inwardly in bores 68, they compress the liquid L. However, since head portions 64 and 65 are connected to one another by sleeve 62, the pressure forces on the head members counterbalance one another to a very large extent and there is no substantial separating force on the brazed joints. As before, therefore, this spring can carry a much greater load than conventional liquid springs.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A liquid spring comprising inner and outer tubular members disposed concentrically one within the other, said inner member having enlarged head portions at opposite ends which have fixed fluid-tight connections to said outer member, said inner member having a shank portion of smaller diameter than said head portions whereby an annular peripheral recess is provided on said inner member intermediate its head portions which is closed by said outer member to form a chamber, said inner member having a bore accentric of the axis of said members and communicating with said chamber, a compressible liquid filling said bore and said chamber, and a piston reciprocable in said bore to compress said liquid.

2. A liquid spring comprising concentric inner and outer tubular members disposed one within the other, said inner member having fixed fluid-tight connections around its periphery to said outer member at both ends, said outer member having an internal recess intermediate its ends which is closed by said inner member to form a chamber, said outer member having a bore eccentric of the axis of said members communicating with said chamber, a compressible liquid filling said bore and said chamber, and a piston reciprocable in said bore to compress said liquid.

3. A liquid spring comprising inner and outer tubular members disposed one within the other, said inner member having fluid tight connection around its periphery to said outer member at both ends, said inner member having an annular peripheral recess intermediate its ends, said recess being closed by said outer member to form a chamber, said inner member having a pair of bores disposed at diametrically opposite sides of its axis and communicating with said chamber, a compressible liquid filling said bores and said chamber, and a pair of pistons reciprocable, respectively, in said bores to compress said liquid.

4. A liquid spring comprising inner and outer tubular members disposed one within the other, said inner member having fluid tight connection around its periphery to said outer member at both ends, said outer member having a central bore which passes axially through it and an internal recess intermediate its ends, said inner member comprising a sleeve positioned in said central bore, said recess being closed laterally by said sleeve to form a chamber, said outer member having a pair of bores parallel to said central bore and positioned at diametrically opposite sides thereof, said bores having communication with said chamber, a compressible liquid filling said bores and said chamber, and a pair of pistons reciprocably mounted, respectively, in said pair of bores to compress said liquid.

5. A liquid spring comprising an external member which is provided with two axially-spaced head portions and with an internal recess between said two head portions, a tubular member disposed within said external member and coaxial therewith, said tubular member having fixed leak-proof connections at its opposite ends to said head portions, said tubular member forming with said recess a chamber, one of said head portions having a pair of cylinders therein which are disposed, respectively, at diametrically opposite sides of said tubular member and which communicate with said chamber, a compressible liquid filling said chamber and said cylinders, and a piston reciprocable in each cylinder.

6. A liquid spring comprising an external sleeve, a spool mounted within said sleeve coaxially thereof, said spool having two head portions at opposite ends, respectively, and a shank of smaller diameter than said head portions connecting said head portions, said head portions having fixed liquid-tight connections with said sleeve at its opposite ends, the space around said shank and between said shank and said sleeve forming a chamber closed at opposite ends by said head portions, one of said head portions having a cylinder therein communicating with said chamber, a compressible liquid filling said chamber and said cylinder, and a piston reciprocable in said cylinder, means for sealing against leakage of liquid from said cylinder along said piston and from entry of air into said cylinder, the area of the inner face of the other head portion being less than the area of the opposing inner face of said one head portion by the area of said cylinder.

7. A liquid spring comprising an external sleeve, a spool mounted within said sleeve coaxially thereof, said spool having two head portions at opposite ends, respectively, and a shank of smaller diameter than said head portions connecting said head portions, said head portions having fixed liquid-tight connections with said sleeve at its opposite ends, the space around said shank and between said shank and said sleeve forming a chamber closed at opposite ends by said head portions, one of said head portions having a pair of cylinders therein communicating with said chamber and disposed, respectively, at diametrally opposite sides of the axis of said spool, a compressible liquid filling said chamber and said cylinders, and a piston reciprocable in each cylinder, the area of the inner face of the other head portion being less than the area of the opposing inner face of said one head portion by the areas of said cylinders.

8. A liquid spring comprising an external sleeve, a spool mounted within said sleeve coaxially thereof, said spool having two head portions at opposite ends, respectively, and a shank of smaller diameter than said head portions connecting said head portions, said head portions having peripheral grooves in them and being soldered to said sleeve at its opposite ends, the solder entering said grooves, the space around said shank and between said shank and said sleeve forming a chamber closed at opposite ends by said head portions, one of said head portions having a cylinder therein, a piston reciprocable in said cylinder, said cylinder communicating with said chamber at one side only of said piston, and a compressible liquid filling said chamber and said cylinder.

9. A liquid spring comprising an external sleeve, a spool mounted within said sleeve coaxially thereof, said spool having two head portions at opposite ends, respectively, and a shank of smaller diameter than said head portions connecting said head portions, said head portions being soldered to said sleeve at its opposite ends and being shrunk on said head portions, the space around said shank and between said shank and said sleeve forming a chamber closed at opposite ends by said head portions, one of said head portions having a cylinder therein, a piston reciprocable in said cylinder, said cylinder communicating with said chamber at one side only of said piston, and a compressible liquid filling said chamber and said cylinder.

10. A liquid spring comprising an external sleeve, a spool mounted within said sleeve coaxially thereof, said spool having two head portions at opposite ends, respectively, and a shank of smaller diameter than said head portions connecting said head portions, said head portions being soldered to said sleeve at its opposite ends, shrink rings shrunk over said sleeve for additionally holding said sleeve or said head portions, the space around said shank and between said shank and said sleeve forming a chamber closed at opposite ends by said head portions, one of said head portions having a cylinder therein, a piston reciprocable in said cylinder, said cylinder communicating with said chamber at one side only of said piston, and a compressible liquid filling said chamber and said cylinder.

11. A punching device comprising an outer sleeve, a spool mounted concentrically in said outer sleeve and having head portions at its opposite ends and a shank of smaller diameter than said head portions connecting said head portions, said head portions having liquid-tight connections with said sleeve at opposite ends of said sleeve, the space around said shank and between said shank and said sleeve forming a chamber which is closed at both ends by said head portions, said spool having a central bore extending axially therethrough, a pair of cylinders in one of said head portions disposed at diametrically opposite sides of said central bore and equi-spaced from the axis thereof and of equal diameter, each of said cylinders communicating at one end with said chamber, a piston reciprocable in each cylinder and projecting outwardly beyond its cylinder at the opposite end of the said cylinder, a punch reciprocable in said central bore, means connecting said punch to said pistons, and a compressible liquid filling said chamber and said cylinders.

References Cited in the file of this patent

UNITED STATES PATENTS

| | | |
|---|---|---|
| 1,028,557 | Dreher | June 4, 1912 |
| 1,543,010 | Johnson | June 23, 1925 |
| 2,733,060 | Taylor | Jan. 31, 1956 |
| 2,757,735 | Taylor | Aug. 7, 1956 |
| 2,760,575 | Taylor | Aug. 28, 1956 |
| 2,785,887 | Taylor | Mar. 19, 1957 |
| 2,793,031 | Hartel | May 21, 1957 |

FOREIGN PATENTS

| | | |
|---|---|---|
| 422,686 | Great Britain | Jan. 16, 1935 |
| 641,527 | Great Britain | Aug. 16, 1950 |
| 664,972 | Great Britain | Jan. 16, 1952 |